(12) United States Patent
Barthel et al.

(10) Patent No.: US 7,314,512 B2
(45) Date of Patent: Jan. 1, 2008

(54) TREATMENT OF SURFACES TO STABILIZE HEAVY METALS

(75) Inventors: James Barthel, Arvada, CO (US); Mark A. Peters, Westminster, CO (US)

(73) Assignee: MT2, LLC, Arvada, CO (US)

( * ) Notice: Subject to any disclaimer, the term of this patent is extended or adjusted under 35 U.S.C. 154(b) by 726 days.

(21) Appl. No.: 10/734,693

(22) Filed: Dec. 12, 2003

(65) Prior Publication Data

US 2004/0127620 A1 Jul. 1, 2004

Related U.S. Application Data

(62) Division of application No. 10/406,617, filed on Apr. 3, 2003, now Pat. No. 6,984,769.

(60) Provisional application No. 60/369,956, filed on Apr. 4, 2002.

(51) Int. Cl.
*C07G 17/00* (2006.01)
*C09D 1/02* (2006.01)
*C04B 41/50* (2006.01)
*A62D 3/33* (2006.01)
*B05D 3/10* (2006.01)

(52) U.S. Cl. .............. 106/287.1; 106/287.21; 106/287.22; 106/287.24; 106/287.29; 106/287.32; 106/287.35; 427/337; 427/343; 588/315; 588/407; 588/901

(58) Field of Classification Search ............... 588/407, 588/412, 315, 318, 256, 901, 236; 427/341, 427/355, 337, 343; 106/287.1, 287.21, 287.22, 106/287.24, 287.29, 287.32, 287.35
See application file for complete search history.

(56) References Cited

U.S. PATENT DOCUMENTS

| | | | |
|---|---|---|---|
| 5,637,355 A | 6/1997 | Stanforth et al. | 427/341 |
| 5,667,696 A | 9/1997 | Studer et al. | 210/702 |
| 5,674,108 A | 10/1997 | Rolle | 451/38 |
| 5,700,107 A | 12/1997 | Newton | 405/128 |
| 5,827,574 A | 10/1998 | Stanforth et al. | 427/341 |
| 5,902,392 A | 5/1999 | Henkelman et al. | 106/260 |
| 5,911,838 A | 6/1999 | Barnett | 134/38 |
| 6,001,185 A | 12/1999 | Huff | 134/2 |
| 6,050,929 A | 4/2000 | Forrester | 588/256 |
| 6,089,955 A | 7/2000 | Rolle et al. | 451/38 |
| 6,186,939 B1 | 2/2001 | Forrester | 588/256 |
| 6,258,018 B1 | 7/2001 | Pal et al. | 588/256 |
| 6,515,053 B1 | 2/2003 | Forrester | 524/140 |

*Primary Examiner*—Wayne A. Langel
*Assistant Examiner*—James Fiorito
(74) *Attorney, Agent, or Firm*—Marsh Fischmann & Breyfogle LLP

(57) ABSTRACT

A reactive coating composition and method for treating a surface including heavy metals by applying the reactive coating composition to the surface. The surface can be, for example, a paint layer containing heavy metals. The reactive coating composition includes a stabilizing agent to stabilize the heavy metal and a permeability enhancing agent to increase the permeability of the paint layer, facilitating the reaction of the heavy metal with the stabilizing agent. The structure including the treated paint layer can be left in place or can be disposed in a non-hazardous landfill.

38 Claims, No Drawings

TREATMENT OF SURFACES TO STABILIZE HEAVY METALS

CROSS-REFERENCE TO RELATED APPLICATIONS

This application is a divisional application of U.S. patent application Ser. No. 10/406,617, entitled "TREATMENT OF SURFACES TO STABILIZE HEAVY METALS" filed on Apr. 3, 2003, now U.S. Pat. No. 6,984,769, which claims priority to U.S. Provisional Patent Application No. 60/369,956, entitled "TREATMENT OF PAINTED SURFACES TO STABILIZE HEAVY METALS" filed on Apr. 4, 2002. Each of the foregoing is incorporated herein by reference in its entirety.

BACKGROUND OF THE INVENTION

1. Field of the Invention

The present invention relates to a reactive coating composition and to the treatment of a surface containing heavy metals by coating the surface with the reactive coating composition. The surface can include a paint layer containing heavy metals. Stabilizing agents within the coating composition penetrate the paint layer upon contact to stabilize the heavy metals. The coating composition dries and remains adhered to the paint layer to form a treated paint layer having reduced leachability. The reactive coating composition can be applied onto a painted surface to adhere and stabilize heavy metals contained in the painted surface, with or without the removal of the treated paint layer from the surface.

2. Description of Related Art

Many older structures have been coated with a paint that includes one or more heavy metals, such as a lead-based paint. These heavy metals are now recognized as being harmful to animals and humans, even in small quantities. As such, the lead-based paint layers must be treated to minimize the environmental risks associated with the lead.

Lead-based paint layers and other heavy metal-containing layers are found on and around metal, wooden or concrete structures such as bridges, storage tanks and towers, dock yards, military installations, industrial facilities and commercial/residential buildings. Many roadways and parking lots have also been painted with lead-based paint compositions. Government regulations require the removal of the lead-based paint layer and/or disposal of the materials coated with the lead-based paint in a manner that minimizes the environmental risk.

There have been many attempts in the prior art to stabilize heavy metals, such as lead in lead-based paints. Some methods contemplate the treatment of the material either during or after generation of paint waste by removing the paint from the painted structure. For example, U.S. Pat. No. 5,911,838 by Barnett discloses the application of an aqueous solution to a painted surface, where the solution includes a solvent, a film former, a viscosity builder and an alkaline compound. The solution causes the paint to coagulate and separate from the substrate such that the paint can be stripped from the substrate. The stripped paint must then be treated to convert the lead to an insoluble form, or it must be disposed as a hazardous waste.

U.S. Pat. No. 6,186,939 by Forrester discloses that heavy metals can be complexed when exposed to natural or induced leaching conditions by contacting a stabilizing agent with paint particles as the paint particles are generated into paint waste by sandblasting the paint from a surface. It is also disclosed that the paint surface can be coated with a stabilizing agent prior to removal of the paint to generate a paint waste. U.S. Pat. No. 6,050,929 by Forrester also discloses that heavy metals can be complexed when exposed to natural or induced leaching conditions by contacting a stabilizing agent with the paint particles as the paint particles are generated by sandblasting.

U.S. Pat. No. 5,667,696 by Studer et al. discloses that a stabilizing agent such as triple superphosphate (TSP) can be mixed with paint waste to stabilize the heavy metals contained in the paint waste.

U.S. Pat. No. 5,674,108 by Rolle discloses compositions for removing coatings such as lead-based paints. A treatment layer is applied that includes a material such as one selected from compounds of sodium and potassium silicates, sodium and potassium phosphates, calcium silicate, iron and aluminum sulfates and also includes an alkaline metal salt. The treatment layer is then removed from the substrate along with the underlying coating. U.S. Pat. No. 6,089,955 by Rolle et al. discloses a method for removing a coating on a surface by applying a treatment composition layer made up of a first material selected from compounds of sodium and potassium silicates, sodium and potassium phosphate, calcium silicate, iron and aluminum sulfates.

U.S. Pat. No. 6,001,185 by Huff discloses that a material such as calcium phosphate can be added to paint or other surface coatings and applied over a previously applied heavy metal contaminated paint. It is disclosed that the finely ground calcium phosphate compounds in the new coating react with the heavy metal compound in the contaminated paint to render the heavy metal compound immobile and biologically non-hazardous U.S. Pat. No. 5,637,355 by Stanforth et al. also discloses that additives can be added to a standard commercial paint and the mixture can be sprayed onto a lead-bearing paint surface. The paint and coating are then removed from the surface such as by sand-blasting. U.S. Pat. No. 5,902,392 by Henkelman et al. discloses a similar composition and method.

However, a method for the stabilization of lead-based paint on the existing material surface that permits: (i) the removal of the non-hazardous material coating and continued use of the structure; (ii) the application of standard coatings (e.g., paint) over the stabilized heavy metal coating; or (iii) the disposal of the material and structure as non-hazardous debris in a cost effective manner, has eluded the environmental industry.

Many older structures have been re-painted many times with lead-based paint without removal of the previous paint layer and therefore the paint is often very thick and the heavy metal concentration is high. In addition, most lead-based paint layers have been painted over with paint that does not include heavy metals, preventing direct surface access to the lead-based paint layer. Further, when the lead-based paint is applied to wood, some of the paint may be absorbed into the wood, making it difficult to remove all of the lead-based paint by sanding or scraping without removing a significant amount of the underlying wood. The generation of paint waste by removing the paint can also create a fine dust that can carry the heavy metals into the environment if the dust is not suppressed.

There remains a need for an improved coating composition for the treatment of paint layers including a heavy metal, such as those formed from lead-based paints. It would be advantageous if such a coating had strong adherence to the paint layer and did not require the generation of a hazardous paint waste by removing the paint from the surface prior to disposal. It would also be advantageous to provide a coating composition that can be applied to a paint layer and is capable of reacting with the heavy metals in the paint layer to fixate the heavy metals, reducing their leachability and enabling the structure to remain in place, or minimizing the release of lead-based paint into the air, soil and work site during demolition activities.

BRIEF SUMMARY OF THE INVENTION

The present invention is directed to a reactive coating composition that includes a stabilizing agent that can react with a heavy metal contained in a paint layer to reduce the leachability of the heavy metal to an acceptable level and form a treated paint layer. Many older structures have multiple paint layers on the structure surface and as used herein the term "paint layer" includes multiple paint layers as well as a single paint layer. Also, as used herein, the term "structure" includes complete structures such as buildings, bridges and towers as well as the different structural components that make-up the overall structure. The reactive coating composition can be formulated such that the treated paint layer is sufficiently durable to withstand the rigors of exterior weather elements such as repeated rain events, or can be used on the interior of a building and can be safely left in place. In addition, the reactive coating composition is formulated such that it increases the permeability of the paint layer as it is applied so that the stabilizing agent can react with heavy metals in the various paint layers without the necessity of additional process steps. In this manner, the available heavy metals in the treated paint layer are stabilized (i.e., chemically converted) during the application process and remain in the stabilized form in its normal environment or when moved to a disposal environment (e.g., a landfill). Heavy metals that are not immediately treated are safely encapsulated by the coating in the event that the structure is not removed.

The reactive coating composition can also be applied over a paint layer that does not include heavy metals. For example, an older structure may have underlying paint layers including a heavy metal that have subsequently been covered with a non-heavy metal paint layer. The reactive coating composition according to the present invention can penetrate the non-heavy metal paint layer to react with the underlying heavy metals.

Thus, according to one embodiment of the present invention, a reactive coating composition is provided for the stabilization of a paint layer containing a heavy metal. The coating composition includes at least about 3 weight percent of a heavy metal stabilizing agent, at least about 1 weight percent of a permeability enhancing agent that is adapted to increase the permeability of the stabilizing agent into the paint layer and a vehicle that includes a binder. The coating composition adheres to the paint layer to form a treated paint layer that can be safely disposed as paint debris in a non-hazardous landfill or can be left in place on the structure. The vehicle can be a standard paint composition, such as a latex paint composition.

According to another embodiment of the present invention, a method for making a reactive coating composition is provided. The method can include the steps of providing a water-based paint composition, such as a latex paint, adding at least about 3 weight percent of a heavy metal stabilizing agent to the paint composition and adding at least about 1 weight percent of a permeability enhancing agent to the paint composition.

According to another embodiment of the present invention, a method for the stabilization of a heavy metal contained in a paint layer is provided. The method includes the steps of providing a reactive coating composition including a heavy metal stabilizing agent and a permeability enhancing agent. The coating composition is applied to a paint layer on a structure, such as a wooden or metal structure, and is left in contact with the paint layer for a period of time sufficient to stabilize heavy metals contained in the paint layer. The treated paint layer can then be removed from the structure, however no removal of the coating composition or treated paint layer is necessary.

According to another embodiment of the present invention, a method for the treatment of a structure having heavy metals on a surface of the structure is provided. The surface according to this embodiment can be barren (e.g., unpainted), and a permeability enhancing agent may not be necessary. Accordingly, the reactive coating composition can include a heavy metal stabilizing agent and a vehicle including a binder.

The present invention provides an economical means for long-term environmental protection by stabilizing heavy metals, such as lead, contained in paint layers. At least a portion of the heavy metals in the paint layer is converted into a highly stable, heavy metal complex compound having reduced leachability while remaining disposed in the paint layer on the structure. Mixing, processing and other treatment steps are not required to facilitate formation of the heavy metal complex. The entire paint layer thereby becomes non-hazardous and capable of passing stringent RCRA (Resource Conservation and Recovery Act) testing criteria, including TCLP (Toxicity Characteristic Leaching Procedure), SPLP (Synthetic Precipitation Leaching Procedure) and STLC (Soluble Threshold Limit Concentration). Under the RCRA, solid wastes are considered hazardous and therefore subject to stringent disposal regulations if the waste leaches excessive heavy metals under the TCLP set forth in the Federal Register, Vol. 55, No. 126, pp. 26985 to 26998.

The TCLP assumes that the paint layer is exposed to leachate from an uncovered landfill and the test involves leaching a sample of the paint with dilute acetic acid, simulating the decay of solid wastes. In addition to the requirements under the RCRA, some states such as California and Michigan have imposed more stringent requirements for the disposal of heavy metal bearing wastes.

However, even the RCRA does not recognize some of the practicalities of waste disposal. For example, if a water soluble coating is applied to a paint layer and the coating does not immediately react with the underlying heavy metal, the coating will be susceptible to removal and/or dilution if exposed to moisture (e.g., rain) before entering the landfill. This can result in a landfilled waste that will leach unacceptable levels of heavy metal into the surrounding environment.

The reactive coating composition of the present invention can be applied using a number of traditional methods including spraying, brushing, rolling or others. The coating provides an immediate and long-term treatment of the paint layer and the coating can remain affixed to the paint layer throughout the disposal process. The coating can be applied just prior to disposal or can be applied as a routine preventive maintenance coating. No significant chemical curing or set-up time is required. The reactive coating composition can advantageously be used in renovation and remodeling projects to coat older lead-based paints to render the lead in those paints substantially less hazardous.

DETAILED DESCRIPTION OF THE INVENTION

The reactive coating composition according to the present invention preferably includes at least two active components that enable the coating composition to penetrate a paint layer and react with heavy metals contained in the paint layer. The first component is a heavy metal stabilizing agent adapted to reduce the leachability of the heavy metal, such as by forming a complex compound with the heavy metal. The second component is a permeability enhancing agent that increases the permeability of the paint layer enabling penetration of the stabilizing agent into the paint layer. These components are carried in a flowable, liquid vehicle that can be readily applied to an existing paint layer.

The heavy metal stabilizing agent can be selected from among flocculants, coagulants, precipitants, complexing agents, epoxy agents and adsorbents. Preferably, the heavy metal stabilizing agent is a chemical compound either in liquid or solid form that can react with a heavy metal or soluble heavy metal compound to form a heavy metal compound that will not release substantial quantities of the heavy metal when subjected to a wide range of pH conditions such as pH 2.5 to about pH 10.5. Stated another way, the heavy metal will have a reduced leachability. The heavy metal stabilizing agent can be selected from phosphate compounds, silicate compounds, carbonate compounds and sulfide compounds. The heavy metal stabilizing agent can be soluble, insoluble or partially soluble within the reactive coating composition and can be added to the coating composition in the form of a liquid, granular solids or a powder. Particularly preferred are phosphate compounds that can provide a phosphate anion to react with the heavy metal and form a complex compound having reduced leachability. Sources of such phosphate compounds include apatite (rock phosphate) or fish bones, soluble alkali or alkaline earth phosphate salts, partially soluble salts such as partially soluble calcium phosphate salts and phosphoric acid. Examples of particularly useful phosphate compounds according to the present invention are illustrated in Table 1.

TABLE 1

| Phosphate Compound | Nominal Formula |
|---|---|
| Phosphoric Acid | $H_3PO_4$ |
| Monocalcium Phosphate | $CaH_4(PO_4)_2$ |
| Dicalcium Phosphate | $CaHPO_4$ |
| Tricalcium Phosphate | $Ca_3(PO_4)_2$ |
| Sodium Phosphate | $Na_3PO_4$ |
| Single Superphosphate | $Ca(H_2PO_4)_2$[1] |
| Triple Superphosphate | $Ca(H_2PO_4)_2$[2] |

[1] including about 20 w/o $P_2O_5$
[2] including about 46 w/o to 48 w/o $P_2O_5$ Particularly preferred among these are phosphoric acid and triple superphosphate (TSP). Dical, which is a blend of monocalcium phosphate and dicalcium phosphate, can also be used. Water soluble phosphate compounds can be dissolved in water before mixing with the other components of the coating composition. When a solid phosphate compound is utilized, it is preferred that the phosphate compound be in the form of particles having an average particle size of not greater than about 250 μm.

In addition to a heavy metal stabilizing agent, the reactive coating composition also includes a permeability enhancing agent. The permeability enhancing agent is a compound that is adapted to increase the permeability of the paint layer, thereby facilitating the reaction of the heavy metal stabilizing agent with the heavy metals contained in the paint layer. Accordingly, the permeability enhancing agent chemically softens the underlying paint layer. The permeability enhancing agent can be an organic or inorganic compound. For example, the permeability enhancing agent can be selected from alkali or alkaline earth hydroxides or carbonates in liquid or solid form.

Particularly preferred permeability enhancing agents according to the present invention can be selected from N-Methyl-2-Pyrrolidone (NMP), ethyl lactate, methyl ethyl ketone, dimethyl sulfoxide (DMSO) and sodium hydroxide. NMP ($C_5H_9NO$) is a cyclic amine that is soluble in water. Ethyl lactate ($C_5H_{10}O_3$), sometimes referred to as lactic acid ethyl ester, also has a high solubility in water. Methyl ethyl ketone ($C_4H_8O$), sometimes referred to as 2-butanone or methyl acetone, is also highly soluble in water. Sodium hydroxide (NaOH), sometimes referred to as caustic soda, is a common caustic material that has a high solubility in water. Another preferred permeability enhancing agent is a refined soybean oil, which can be mixed with surfactants. Among the foregoing, NMP is particularly preferred as a permeability enhancing agent according to the present invention.

When sodium hydroxide is used as the permeability enhancing agent, it can be added to the coating composition as a solid material. However, it is often more convenient to add the sodium hydroxide in liquid form, such as by adding a fifty weight percent solution of sodium hydroxide. Other permeability enhancing agents are typically added in liquid form.

The addition of a permeability enhancing agent such as NMP gives polar solvating capabilities to the coating composition and the solvating characteristics of the permeability enhancing agents, particularly NMP, for oils and hydrocarbons are very good. In the presence of sufficient water, mineral dissolution of the heavy metal stabilizing agent occurs, for example the release of polyatomic phosphate anions ($PO_4^{-3}$) from TSP. The phosphate ions make physical contact with the lead in the paint layer by diffusion and/or Brownian movement and form complex heavy metal compounds having reduced leachability. In addition, the permeability enhancing agent aids in reducing the hardness of the paint layer(s). By decreasing the hardness of the paint layer and increasing the solvating characteristics of the coating, the efficiency of diffusion and Brownian movement of the ions responsible for heavy metal complexing (e.g., phosphate anions) is greatly enhanced.

The coating composition also includes a vehicle to facilitate the application of the stabilizing agent and permeability enhancing agent to the paint layer. The vehicle can preferably be an aqueous-based vehicle and can include materials such as binders to increase the viscosity of the coating composition such that the coating composition can be deposited onto a paint layer without significant running of the coating, even when the paint layer is vertically disposed. The binders can be selected from among materials such as alkyd resin, polyurethane, acrylic resin, polyvinyl acetate, and ethylene glycol.

Preferably, the reactive coating composition has a low volatile organic content (VOC). Volatile organics are harmful to the environment and can also be harmful to the user (i.e., to the person applying the coating). It is preferred that the reactive coating compositions of the present invention have a VOC of not greater than about 250 grams per liter (g/l), more preferably not greater than about 200 g/l.

According to one embodiment of the present invention, the reactive coating composition is formed by adding the heavy metal stabilizing agent and the permeability enhancing agent to a commercially-available paint, such as a latex paint. According to this embodiment, the coating composition can also include other components. A latex-based paint composition typically includes components such as pigments, a binder, a thinner and other additives. The pigment provides color and can protect the binder from weathering. The binder acts as a vehicle and provides durability and adhesion to the surface upon which the paint is applied. Common binders found in latex paints include linseed oil, alkyd, polyurethane, acrylic resin and polyvinyl acetate (PVA). The thinner controls the consistency of the paint and influences the drying rate and the thinner in latex compositions is typically water. According to the present invention, additional water can be added to the paint composition to maintain the flow properties of the paint composition.

Thus, the paint can include pigments (e.g., $TiO_2$) that impart an aesthetically pleasing color to the coating composition, enabling the coated paint layer to remain on the structure. For example, the coating composition can be used to treat painted surfaces within a residential building. The residential building can then safely remain in place and meet the relevant regulatory criteria for heavy metals without complete removal of the heavy metal containing paint layer or removal of the painted component (e.g., a window frame). Further, after application of the reactive coating composition, a standard commercial paint can be applied over the treated layer.

The reactive coating composition according to the present invention preferably includes at least about 3 weight percent of the heavy metal stabilizing agent, more preferably at least about 5 weight percent of the heavy metal stabilizing agent and even more preferably at least about 10 weight percent of the heavy metal stabilizing agent. The amount of heavy metal stabilizing agent can be up to about 75 weight percent of the coating composition, preferably is not greater than about 60 weight percent, such as up to about 50 weight percent of the heavy metal stabilizing agent. For example, the stabilizing agent can be in the range of from about 5 to about 60 weight percent and more preferably from about 10 to about 40 weight percent of the coating composition. In one preferred embodiment, the reactive coating composition includes from about 20 to 40 weight percent of the heavy metal stabilizing agent.

The amount of permeability enhancing agent utilized in the reactive coating composition is an amount sufficient to increase the permeability of the underlying paint layer and enable the penetration of the heavy metal stabilizing agent into the paint layer. Preferably, the reactive coating composition includes at least about 1 weight percent of the permeability enhancing agent, more preferably includes at least about 3 weight percent of the permeability enhancing agent and even more preferably includes at least about 5 weight percent of the permeability enhancing agent. Preferably, the amount of permeability enhancing agent does not exceed about 60 weight percent, more preferably does not exceed about 40 weight percent and even more preferably does not exceed about 25 weight percent. For example the amount of permeability enhancing agent can be from about 5 weight percent to about 25 weight percent, more preferably from about 5 weight percent to about 15 weight percent of the reactive coating composition.

In addition, it is preferred that the weight ratio of heavy metal stabilizing agent to permeability enhancing agent is in the range of from about 2:1 to 4:1.

The preferred amount of binder in the reactive coating composition is an amount that is sufficient to adhere the coating composition to the paint layer, in the same way that a standard paint composition adheres to a surface. Thus, the total amount of binder is preferably at least about 10 weight percent and more preferably is at least about 40 weight percent. In one embodiment, the coating composition includes from about 40 weight percent to about 80 weight percent of the binder. When the heavy metal stabilizing agent and the permeability enhancing agent are added to a standard paint composition, all or a portion of the binder can be supplied by the paint composition.

The coating composition can also include water, either added separately or with the active components. For example, TSP can be added in an aqueous solution and/or the sodium hydroxide can be added as a dilute solution. The additional water can provide flowability to the coating composition and can also aid dissolution of the heavy metal stabilizing agent (e.g., TSP).

The coating composition of the present invention can be applied to the paint layer using any of a number of techniques, including applying the coating composition with a brush or roller, or by spraying the composition directly onto the surface of the paint layer. The amount of the components in the coating composition, such as the binder(s) and water, will be at least partially dictated by the method that is selected to apply the coating composition to the paint layer. For example, spraying devices require that the coating composition have a viscosity and related flow characteristics within a specified range to enable steady and consistent flow through the spray nozzle.

The desired thickness of the reactive coating layer will depend upon the heavy metal content of the underlying paint as well as the concentration of the active components in the coating composition. The paint layer can be pre-tested to measure the heavy metal content and the appropriate coating thickness to be applied can be determined. It is generally preferred that the total thickness of the coating composition is at least about 5 mils (0.13 mm), more preferably at least about 20 mils (0.52 mm). The application of two or more layers of the coating composition may be desirable in some instances. Although washing of the paint layer prior to application of the coating composition may improve adhesion of the reactive coating, the coating composition can be applied directly to the paint surface without any pretreatment such as washing or pre-softening of the existing paint. The coating composition can also be applied to a peeling or cracking paint surface.

Although the foregoing description refers primarily to lead-based paint layers, the paint layer can include other metals that are treated by the coating composition to reduce the leachability of the metals. Examples include barium (Ba), silver (Ag), arsenic (As), cadmium (Cd), mercury (Hg), antimony (Sb), selenium (Se) and chromium (Cr).

The reactive coating composition can be applied to a paint layer or other heavy-metal containing coating that is on virtually any structure. While the treated structure can be demolished and safely disposed in a landfill, the treated structure can also remain in place since the metals, such as lead contained in the paint layer, have a substantially reduced environmental exposure potential. When and if the structure is demolished, the coating acts as a dust suppressant to reduce the potential for harmful lead-containing dust to be released into the atmosphere. Further, the dried treated paint layer will be able to withstand repeated exposure to rain or similar weather events.

Alternatively, the coating composition and the treated paint layer can be removed from the structure. This embodiment is particularly advantageous when the structure is to remain in place, such as a metal bridge or tower or a concrete structure. The coating composition and the paint layer can be removed by conventional means such as blasting with an abrasive media (e.g., sandblasting) or by scraping the layers from the surface of the structure. Since the heavy metals contained in the paint layer are rendered non-hazardous by the application of the coating composition, the waste can be disposed of as a non-hazardous waste.

Although described above with respect to the treatment of a heavy-metal containing paint layer, the reactive coating composition can also be utilized to treat other surfaces containing heavy metals. According to one embodiment of the present invention, a reactive coating composition can be applied to a structure that is contaminated with heavy metals that have coated and/or penetrated the surface of the structure. For example, heavy metals are present in a variety of manufacturing environments, such as manufacturing plants for batteries. Over time, the heavy metals can coat and penetrate the barren (unpainted) wood, concrete, brick and other materials in the manufacturing facility. Heavy metals can also be present in areas such as firing ranges, where the lead from the ammunition can coat and penetrate the firing range structure.

In this embodiment, it may not be necessary for the reactive coating composition to include a permeability enhancing agent. For example, a reactive coating composition including a vehicle and a heavy metal stabilizing agent can be applied to a material such as concrete that has been exposed to heavy metals. The coating composition can be applied to the material surface and allowed to dry to reduce the leachability of heavy metals in and on the material. Thereafter, the material can be safely disposed as non-hazardous waste or can be safely left in place due to the stabilization of the heavy metals. In one embodiment, this reactive coating composition includes a heavy metal stabilizing agent added to a paint composition.

EXAMPLES

A number of Examples according to the present invention were prepared and tested to determine the reduced leachability and presence of complexed heavy metals, the penetration of the active components into the paint layers, the ability to remove the treated coating and the ability to apply the coating. It will be appreciated that the following Examples are merely illustrative of the present invention and that the preferred ranges of reactive components will depend upon a number of factors, including the heavy metal content of the paint layer.

NaOH as the Permeability Enhancing Agent

In the following Examples 1-18, wooden boards that were painted with a lead-based paint many years ago were treated by applying a coating composition to the paint layer. The coating composition was formed by adding the reactive components described in Tables 2 to 5 to a commercial white latex flat ceiling paint (Dutch Boy White Latex #3805). All percentages are weight percentages based on the initial weight of the commercial paint, and do not include the weight of any water added with the reactive components. For example, the NaOH was added to the paint as a 50 weight percent solution. The TCLP filtrates of untreated boards contained between 23 and 72 parts per million (ppm) lead (averaging about 44 ppm), well above the RCRA threshold of 5 ppm. Penetration of the active components into the paint layers was visually confirmed. After the coating dried, the boards were sampled by drilling through the board and testing the resulting shavings. Standard TCLP testing procedures were utilized to confirm the reduced leachability of the lead.

A first group of examples utilizing TSP as a stabilizing and NaOH as a permeability enhancing agent are illustrated in Table 2.

TABLE 2

TSP and NaOH

| Example No. | Reactive Components | TCLP Pb (ppm) |
|---|---|---|
| 1 | 10% TSP + 5% NaOH | 9.1 |
| 2 | 20% TSP + 5% NaOH | 2.3 |
| 3 | 10% TSP + 10% NaOH | 2.4 |
| 4 | 40% TSP + 7% NaOH | 1.5 |
| 5 | 30% TSP + 5% NaOH | 1.0 |
| 6 | 30% TSP + 10% NaOH | 0.75 |
| 7 | 20% TSP + 0% NaOH | 9.2 |
| 8 | 20% TSP + 5% NaOH | 5.3 |
| 9 | 20% TSP + 10% NaOH | 2.8 |

The Examples illustrated in Table 2 demonstrate that for a given lead content in the paint layer, a sufficient amount of both reactive components should be used. Comparing Examples 1, 2 and 5, when a permeability enhancing agent (NaOH) content of 5 weight percent was used, a TSP loading of greater than 10 weight percent was needed to reduce the lead leachability to less than 5 ppm. When the permeability enhancing agent was increased to 10 weight percent, however, 10 weight percent TSP was sufficient to reduce the leachability to less than 5 ppm and penetration of the coating into the paint layers was visually confirmed. When no sodium hydroxide was used (Example 7), 20 weight percent TSP was not sufficient to reduce the leachability of the lead to less than 5 ppm. The difference in leachable lead values between Examples 2 and 8 can be attributed to varying levels of lead in the paint layers.

A second group of examples utilizing Dical (a mixture of monocalcium phosphate and dicalcium phosphate) as a stabilizing agent are illustrated in Table 3.

TABLE 3

Dical and NaOH

| Example No. | Reactive Components | TCLP Pb (ppm) |
|---|---|---|
| 10 | 20% Dical + 0% NaOH | 11.7 |
| 11 | 20% Dical + 5% NaOH | 5.3 |
| 12 | 30% Dical + 0% NaOH | 9.1 |
| 13 | 30% Dical + 5% NaOH | 2.3 |

Table 3 illustrates that a permeability enhancing agent (NaOH) was necessary to increase the permeability of the paint layers and reduce the TCLP lead to acceptable levels.

A third group of examples utilizing phosphoric acid ($H_3PO_4$) as a stabilizing agent are illustrated in Table 4.

TABLE 4

$H_3PO_4$ and NaOH

| Example No. | Reactive Components | TCLP Pb (ppm) |
|---|---|---|
| 14 | 15% $H_3PO_4$ + 5.9% NaOH | 1.7 |
| 15 | 20% $H_3PO_4$ + 7.9% NaOH | 4.7 |
| 16 | 20% $H_3PO_4$ + 0% NaOH | 6.4 |

Table 4 illustrates that the addition of sodium hydroxide reduced the leachability of lead to less than 5 ppm when phosphoric acid was used as the stabilizing agent.

A fourth group of examples utilizing different sodium phosphate salts as a stabilizing agent are illustrated in Table 5.

TABLE 5

Phosphate Salt and NaOH

| Example No. | Reactive Components | TCLP Pb (ppm) |
|---|---|---|
| 17 | 15% $Na_3PO_4 \cdot 12H_2O$ | 23 |
| 18 | 20% $NaH_2PO_4 \cdot H_2O$ + 5% NaOH | 3.7 |

Table 5 illustrates that sodium phosphate salts can be effective as stabilizing agents to decrease the leachability of lead to less than 5 ppm when utilized with a permeability enhancing agent such as NaOH.

NMP as a Permeability Enhancing Agent

In the following set of Examples N-Methyl-2-Pyrrolidone (Lyondell Chemical Co., Houston, Tex.) was added to a conventional white latex interior paint (Sherwin Williams white flat latex Home Builders B75 WJ670) or exterior paint (Sherwin Williams white latex external, B13 WJ515 Satin, Base A). Triple superphosphate (Hi-Yield Triple Superphosphate, Voluntary Purchasing Groups, Inc., Bonham, Tex.) was also added as the heavy metal stabilizing agent.

To prepare the compositions, water was first added to the paint composition and then the NMP was added and mixed. TSP was then added and mixed, and more water was added if necessary. The compositions were spread onto a wood board having a lead based paint coated thereon using a brush. The sample was allowed to dry overnight, and in some cases a second coat was applied after the first coat dried. The amount of coating composition applied was measured by weighing the coating container before and after application.

The entire board was then drilled through using a 2-inch diameter Foster drill bit to generate wood shavings. About 17 to 22 grams of wood shavings were transferred to a 500 ml TCLP extraction vessel. A 20× volume of TCLP solution #1 was added and tumbled at 30 rpm for 18 hours. The slurry was allowed to settle and was then filtered with a 0.7 micron glass fiber filter and was assayed for lead.

The results of these Examples are summarized in Tables 6 to 11.

TABLE 6

NMP and TSP

| Example | Paint | Formulation[1] (wt. %) | Coats | Total Applied Composition[2] (gm./in$^2$) | TCLP Pb (ppm) |
|---|---|---|---|---|---|
| 101/103* | Interior | 30% TSP 9.8% NMP 5.4% Water | 1 | 0.6 | 10.1 |
| 102/104* | Interior | 30% TSP 9.8% NMP 5.4% Water | 2 | 1.3 | 1.8 |
| 105 | Interior | 30% TSP 9.8% NMP 5.4% Water | 2 + Overcoat | 1.12 | 2.6 |

*Values averaged from two samples
[1]Balance is paint
[2]Mass of wet paint

Table 6 illustrates that the combination of TSP and NMP was effective for reducing the leachability of the lead, particularly when applied in multiple coats. The formulation including 30% TSP, 9.8% NMP and 5.4% water added to the latex paint composition formed a coating composition that spread evenly, penetrated into the underlying lead-based paint and dried to a hard coating.

TABLE 7

Reduced NMP

| Example | Paint | Formulation[1] (wt. %) | Coats | Total Applied Composition[2] (gm./in$^2$) | TCLP Pb (ppm) |
|---|---|---|---|---|---|
| 106 | Interior | 31% TSP 6.3% NMP 5.4% Water | 1 | 0.5 | 10.1 |
| 107 | Interior | 31% TSP 6.3% NMP 6.3% Water | 2 | 1.3 | 1.5 |

[1]Balance is paint
[2]Mass of wet paint

Table 7 demonstrates that lower levels of the NMP can also be effective when a sufficient amount of the coating composition is applied.

TABLE 8

Increased NMP and/or addition of NaOH

| Example | Paint | Formulation[1] (wt. %) | Coats | Total Applied Composition[2] (gm./in$^2$) | TCLP Pb (ppm) |
|---|---|---|---|---|---|
| 108 | Interior | 30% TSP 18% NMP 4.8% Water | 1 | 0.5 | 5.6 |
| 109 | Interior | 30% TSP 18% NMP 4.8% Water | 2 | 1.06 | 0.8 |
| 110 | Interior | 29% TSP 19% NMP 5.5% NaOH | 1 | 0.75 | 5.1 |
| 111 | Interior | 29% TSP 19% NMP 5.5% Water | 2 | 1.25 | 5.2 |

[1]Balance is paint
[2]Mass of wet paint

Table 8 demonstrates that higher levels of NMP are effective, as is the addition of NaOH to the coating composition.

TABLE 9

Exterior Paint

| Example | Paint | Formulation[1] (wt. %) | Coats | Total Applied Composition[2] (gm./in$^2$) | TCLP Pb (ppm) |
|---|---|---|---|---|---|
| 112 | Exterior | 31% TSP 9.8% NMP 5.4% Water | 1 | 0.8 | 7.9 |
| 113 | Exterior | 31% TSP 9.8% NMP 5.4% Water | 2 | 1.27 | 2.5 |
| 116 | Exterior | 34% TSP 13.1% NMP 12% Water | 1 | 0.7 | 12.3 |
| 117 | Exterior | 34% TSP 13.1% NMP 12% Water | 2 | 1.5 | 5.0 |

[1]Balance is paint
[2]Mass of wet paint

Table 9 demonstrates that reactive coating compositions made with exterior paint are also effective to reduce the leachability of lead.

TABLE 10

Other Stabilizing Agents

| Example | Paint | Formulation[1] (wt. %) | Coats | Total Applied Composition[2] (gm./in$^2$) | TCLP Pb (ppm) |
|---|---|---|---|---|---|
| 118 | Exterior | 26% Dical 8.4% NMP 19% Water | 2 | 8.4 | 8.4 |
| 119 | Exterior | 28% NaH$_2$PO$_4$·H$_2$O 11% NMP 10% Water | 2 | 1.06 | 11.3 |

[1]Balance is paint
[2]Mass of wet paint

Table 10 demonstrates that other heavy metal stabilizing agents, such as NaH$_2$PO$_4$·H$_2$O, can be effective in the reactive coating compositions.

Penetration of Coating Composition

Three reactive coating compositions were prepared and applied to large paint chips to observe the penetration of the coating composition into the paint layer, forming a treated paint layer. The first coating composition included 53 wt. % standard paint, 11 wt. % d-Haz (a composition including 37.5 wt. % NMP, available from Franmer Chemical, Normal, Ill.), 29 wt. % TSP, 5 wt. % NaOH and 1.2 wt. % additional water. The second composition included 53.8 wt. % standard paint, 31 wt. % TSP, 9.8 wt. % NMP and 5.4 wt. % additional water. The third composition included 42 wt. % TSP, 34 wt. % NMP and 24 wt. % of the standard paint.

Large lead-containing paint chips that had been separated from their underlying substrate were obtained and each of the foregoing compositions was applied as one coat to the surface of different paint chips. All three compositions penetrated the paint chip, as demonstrated by visually observing the composition having penetrated through to the opposite surface of the paint chip. The untreated chips demonstrated 58 ppm of TCLP lead and the treated chips all demonstrated less than 0.5 ppm TCLP lead. These examples demonstrate the ability of the reactive coating compositions to penetrate the lead based paint and form a treated paint layer.

Removal of the Coating Composition and Treated Paint Layer

As is discussed above, the treated paint layer formed by the penetration of the reactive coating composition into the existing paint layer can optionally be removed from the structure. Accordingly, the reactive coating composition can be formulated such that the treated paint layer can be easily removed by mechanical scraping. This formulation of the reactive coating composition typically contains higher percentages of the permeability enhancing agent to facilitate the permeation of the underlying paint layer and the removal from the substrate.

Accordingly, a reactive coating composition was formulated including 42 wt. % TSP, 34 wt. % NMP, and 24 wt. % interior paint. One coat of the reactive coating composition was applied onto a structure coated with a lead-based paint and the coating composition was allowed to permeate through the underlying paint layers to form a treated paint layer. The treated paint layer was then mechanically scraped from the structure after approximately 8-12 hours, leaving a bare surface. The removed treated paint layer had a reduced leachability, with results of less than 2 ppm of TCLP lead.

The same composition was applied to a lead-based paint on a wooden surface and allowed to penetrate for 4 hours. The treated paint layer was then stripped from the surface and was found to contain less than 0.1 ppm of TCLP lead. Some paint remained on the surface and a second application of the reactive coating composition was followed by an overnight cure. The treated paint layer was then removed and resulted in complete stripping of the remaining paint. The treated paint layer demonstrated less than 0.7 ppm of TCLP lead.

Treatment of Unpainted Concrete

A sample of unpainted concrete that had been exposed to Pb solutions over many years and which eventually soaked into the concrete was found to fail the TCLP for lead (>10 ppm Pb). The concrete was painted with one coat of a reactive coating composition according to the present invention and was resampled. The painted sample was reduced to less than 5 ppm TCLP lead, demonstrating the utilization of the reactive coating composition on a material such as concrete having heavy metals permeated into its surface.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A reactive coating composition for the stabilization of a heavy metal contained in a paint layer on a surface, said coating composition comprising:
   a) at least about 3 weight percent of a heavy metal stabilizing agent;
   b) at least about 1 weight percent of a permeability enhancing agent adapted to increase the permeability of the heavy metal stabilizing agent into the paint layer, where the permeability enhancing agent is selected from the group consisting of sodium hydroxide, N-Methyl-2-Pyrrolidone, ethyl lactate and dimethyl sulfoxide; and
   c) the balance comprising a vehicle including at least a binder, wherein said coating composition adheres to said paint layer and forms a complex heavy metal compound having reduced leachability.

2. A reactive coating composition as recited in claim 1, wherein said heavy metal stabilizing agent is selected from the group consisting of flocculants, coagulants, precipitants, complexing agents, epoxy agents and adsorbents.

3. A reactive coating composition as recited in claim 1, wherein said heavy metal stabilizing agent is selected from the group consisting of phosphate compounds, silicate compounds, carbonate compounds and sulfide compounds.

4. A reactive coating composition as recited in claim 1, wherein said heavy metal stabilizing agent comprises a phosphate compound.

5. A reactive coating composition as recited in claim 1, wherein said heavy metal stabilizing agent comprises triple superphosphate.

6. A reactive coating composition as recited in claim 1, wherein said heavy metal stabilizing agent is in the form of a solid dispersed in said coating composition.

7. A reactive coating composition as recited in claim 6, wherein said heavy metal stabilizing agent comprises particles of a phosphate compound having an average particle size of not greater than about 250 µm.

8. A reactive coating composition as recited in claim 1, wherein said heavy metal stabilizing agent is in the form of a liquid dispersed in said coating composition.

9. A reactive coating composition as recited in claim 1, wherein said coating composition comprises from about 5 weight percent to about 60 weight percent of said heavy metal stabilizing agent.

10. A reactive coating composition as recited in claim 1, wherein said coating composition comprises from about 20 to about 40 weight percent of said heavy metal stabilizing agent.

11. A reactive coating composition as recited in claim 1, wherein said permeability enhancing agent comprises sodium hydroxide.

12. A reactive coating composition as recited in claim 1, wherein said permeability enhancing agent comprises N-Methyl-2-Pyrrolidone.

13. A reactive coating composition as recited in claim 1, wherein said permeability enhancing agent comprises ethyl lactate.

14. A reactive coating composition as recited in claim 1, wherein said permeability enhancing agent comprises dimethyl sulfoxide.

15. A reactive coating composition as recited in claim 1, wherein said coating composition comprises at least about 3 weight percent of said permeability enhancing agent.

16. A reactive coating composition as recited in claim 1, wherein said coating composition comprises from about 5 weight percent to about 25 weight percent of said permeability enhancing agent.

17. A reactive coating composition as recited in claim 1, wherein said coating composition comprises from about 5 weight percent to about 10 weight percent of said permeability enhancing agent.

18. A reactive coating composition as recited in claim 1, wherein said vehicle further comprises water.

19. A reactive coating composition as recited in claim 1, wherein said vehicle is a latex-based paint composition.

20. A reactive coating composition as recited in claim 1, wherein said coating composition has a VOC content of not greater than about 250 g/l.

21. A reactive coating composition as recited in claim 1, wherein said binder is selected from the group consisting of alkyd resin, polyurethane, acrylic resin, polyvinyl acetate, ethylene glycol and mixtures thereof.

22. A reactive coating composition as recited in claim 1, wherein said coating composition further comprises a pigment.

23. A reactive coating composition for the stabilization of a heavy metal contained in a paint layer on a surface, said coating composition comprising:
 a) from about 5 weight percent to about 60 weight percent of a heavy metal stabilizing phosphate compound;
 b) from about 5 weight percent to about 25 weight percent of a permeability enhancing agent comprising N-Methyl-2-Pyrrolidone; and
 c) the balance comprising a vehicle including at least a binder, wherein said coating composition adheres to said paint layer and forms a complex heavy metal compound having reduced leachability.

24. A reactive coating composition as recited in claim 23, wherein said phosphate compound comprises triple superphosphate.

25. A reactive coating composition as recited in claim 23, wherein said vehicle further comprises water.

26. A reactive coating composition as recited in claim 23, wherein said coating composition comprises from about 10 to about 40 weight percent of said phosphate compound.

27. A reactive coating composition as recited in claim 23, wherein said coating composition comprises from about 5 weight percent to about 10 weight percent of said N-Methyl-2-Pyrrolidone.

28. A reactive coating composition as recited in claim 23, wherein said vehicle is a latex-based paint composition.

29. A reactive coating composition as recited in claim 23, wherein said binder is selected from the group consisting of alkyd resin, polyurethane, acrylic resin, polyvinyl acetate, ethylene glycol and mixtures thereof.

30. A reactive coating composition as recited in claim 23, wherein said coating composition further comprises a pigment.

31. A method for making a reactive coating composition adapted to react with a heavy metal to form a complex heavy metal compound with reduced leachability, comprising the steps of:
 a) providing a water-based paint composition;
 b) adding at least about 3 weight percent of a heavy metal stabilizing agent to said water-based paint composition; and
 c) adding at least about 1 weight percent of a permeability enhancing agent to said water-based paint composition, where the permeability enhancing agent is selected from the group consisting of sodium hydroxide, N-Methyl-2-Pyrrolidone, ethyl lactate and dimethyl sulfoxide.

32. A method as recited in claim 31, wherein said water-based paint composition is a latex paint composition.

33. A method as recited in claim 31, wherein said heavy metal stabilizing agent comprises triple superphosphate.

34. A method as recited in claim 31, wherein said triple superphosphate has a particle size of not greater than about 250 µm.

35. A method as recited in claim 31, wherein said heavy metal stabilizing agent is added in an amount of from about 10 weight percent to about 40 weight percent.

36. A method as recited in claim 31, wherein said permeability enhancing agent comprises N-Methyl-2-Pyrrolidone.

37. A method as recited in claim 31, wherein said permeability enhancing agent is added in an amount of from about 5 weight percent to about 25 weight percent.

38. A method as recited in claim 31, further comprising the step of adding additional water to said water-based paint composition.

\* \* \* \* \*